US 11,782,066 B2

(12) United States Patent
Yamaguchi et al.

(10) Patent No.: US 11,782,066 B2
(45) Date of Patent: Oct. 10, 2023

(54) REAGENT STORAGE DEVICE, REAGENT STORAGE METHOD, AND SHUTTER

(71) Applicant: FUJIFILM WAKO PURE CHEMICAL CORPORATION, Osaka (JP)

(72) Inventors: Isao Yamaguchi, Hyogo (JP); Takaaki Mori, Kanagawa (JP)

(73) Assignee: FUJIFILM Wako Pure Chemical Corporation

( * ) Notice: Subject to any disclaimer, the term of this patent is extended or adjusted under 35 U.S.C. 154(b) by 374 days.

(21) Appl. No.: 17/254,740

(22) PCT Filed: Mar. 19, 2019

(86) PCT No.: PCT/JP2019/011449
§ 371 (c)(1),
(2) Date: Dec. 21, 2020

(87) PCT Pub. No.: WO2020/003648
PCT Pub. Date: Jan. 2, 2020

(65) Prior Publication Data
US 2021/0270860 A1 Sep. 2, 2021

(30) Foreign Application Priority Data
Jun. 28, 2018 (JP) .................................. 2018-123405

(51) Int. Cl.
*G01N 35/02* (2006.01)
*G01N 35/04* (2006.01)
*G01N 35/00* (2006.01)

(52) U.S. Cl.
CPC ...... *G01N 35/025* (2013.01); *B01L 2300/045* (2013.01); *G01N 2035/00287* (2013.01);
(Continued)

(58) Field of Classification Search
CPC ......... G01N 35/025; G01N 2035/0443; G01N 2035/00277; G01N 2035/00306;
(Continued)

(56) References Cited

U.S. PATENT DOCUMENTS 5,632,399 A * 5/1997 Palmieri ................ G01N 35/02
220/255
5,885,529 A 3/1999 Babson et al.
(Continued)

FOREIGN PATENT DOCUMENTS

CN 101203176 6/2008
CN 101749922 6/2010
(Continued)

OTHER PUBLICATIONS

PCT International Search Report in International Appln. No. PCT/JP2019/011449, dated Jun. 25, 2019, 5 pages (With English Translation).
(Continued)

*Primary Examiner* — Jill A Warden
*Assistant Examiner* — John McGuirk
(74) *Attorney, Agent, or Firm* — Fish & Richardson P.C.

(57) ABSTRACT

A reagent storage device of the present disclosure includes a shutter and a moving mechanism. The shutter is configured to open and close an opening in a reagent compartment for housing a reagent container, the reagent compartment being provided with the opening for insertion and removal of a probe used to extract a reagent from inside the reagent container housed in the reagent compartment. The moving mechanism is configured to move the shutter to an overlay position opposing the opening and separated from the opening before moving the shutter downward so as to close off the opening, and is also configured to move the shutter that is closing off the opening upward to open up the opening
(Continued)

before withdrawing the shutter from the overlay position over the opening.

6 Claims, 15 Drawing Sheets

(52) U.S. Cl.
CPC .............. *G01N 2035/0405* (2013.01); *G01N 2035/0443* (2013.01)

(58) Field of Classification Search
CPC ..... G01N 2035/00435; G01N 35/1002; G01N 2035/00287; G01N 2035/0405; B01L 2300/045
See application file for complete search history.

(56) References Cited

U.S. PATENT DOCUMENTS

| | | | | |
|---|---|---|---|---|
| 8,741,236 | B2* | 6/2014 | Panetz | B01L 9/56 141/370 |
| 2008/0085215 | A1* | 4/2008 | Mototsu | G01N 35/025 422/68.1 |
| 2011/0227372 | A1* | 9/2011 | Hirata | B60J 7/0046 296/221 |
| 2018/0071731 | A1* | 3/2018 | Ho | B01L 3/50853 |

FOREIGN PATENT DOCUMENTS

| | | |
|---|---|---|
| CN | 103543281 | 1/2014 |
| CN | 106335710 | 1/2017 |
| CN | 206223796 | 6/2017 |
| CN | 206531785 | 9/2017 |
| CN | 107636470 | 1/2018 |
| CN | 207019332 | 2/2018 |
| JP | 2008020360 | 1/2008 |
| JP | 2009-008611 A | 1/2009 |
| JP | 2009139269 | 6/2009 |
| JP | 2016176777 | 10/2016 |

OTHER PUBLICATIONS

Office Action in Chinese Appln. No. 201980043350.7, dated Aug. 19, 2023, 27 pages (with English translation).

* cited by examiner

REAGENT STORAGE DEVICE, REAGENT STORAGE METHOD, AND SHUTTER

CLAIM OF PRIORITY

This application claims priority under 35 USC § 120 to WIPO International Patent Application No. PCT/JP2019/011449, filed on Mar. 19, 2019 and published as WO2020/003648 on Jan. 2, 2020; which claims priority to Japan Application No. 2018-123405 filed on Jun. 28, 2019, the entire contents of each and both are hereby incorporated by reference.

TECHNICAL FIELD

The present disclosure relates to a reagent storage device that stores a reagent, a reagent storage method, and a shutter.

BACKGROUND ART

Conventional automatic analysis devices are known in which a specimen sampled from a test subject and an appropriate reagent for the respective test contents are mixed to generate a sample, and the components contained in the generated sample, properties of the sample, and the like are automatically analyzed. The reagent mixed with the specimen is generally held in a reagent container. The reagent container in which the reagent is held is housed in a reagent compartment for cooling the reagent provided in the automatic analysis device (see, for example, Japanese Patent Application Laid-Open (JP-A) No. 2009-008611). Such reagent compartments are generally formed in a hermetically sealed box shape, and as in the example of a reagent compartment 2 illustrated in FIG. 15, can be accessed through an opening provided in an upper face of an automatic analysis device body. A probe that extracts the reagent is capable of accessing the reagent container installed inside the reagent compartment 2 through an opening 20c provided in an upper face 20b of the reagent compartment 2.

An upper portion of the reagent container is hermetically sealed by an aluminum seal. A user covers the reagent container with an adapter with a hole to allow the probe access. When this is performed, a blade mounted to the adapter breaks open the aluminum seal, allowing the probe access to the inside of the reagent container through the hole. After the aluminum seal has been opened with the adapter, the open reagent container is placed inside the reagent compartment, and then cooled inside the reagent compartment.

The open reagent container is generally kept in this state for around 30 to 45 days while the reagent in the reagent container is used in analysis.

SUMMARY OF INVENTION

Technical Problem

In automatic analysis devices configured as described above, the interior of the reagent compartment is cooled. However, since the opening 20c configuring part of the reagent compartment is always open, there is a constant flow of external air into the reagent compartment. Such air that has flowed into the reagent compartment is cooled, thus forming condensation. Due to the presence of the hole in the upper portion of the reagent container, air may flow into the reagent container, causing condensation which might mix with the reagent to form inside the reagent container. If condensation becomes mixed with the reagent, the reagent may be diluted, or the reagent may deteriorate prematurely. This makes it difficult for the reagent to remain effective over a long duration.

In consideration of the above circumstances, an object of the present disclosure is to provide a reagent storage device, a reagent storage method, and a shutter that enable the efficacy of a reagent in an open reagent container housed in a reagent compartment to be maintained for a longer duration in the reagent container than in cases in which an opening in a reagent compartment is always open.

Solution to Problem

A reagent storage device of the present disclosure includes a shutter and a moving mechanism. The shutter is configured to open and close an opening in a reagent compartment for housing a reagent container, the reagent compartment being provided with the opening for insertion and removal of a probe used to extract a reagent from inside the reagent container housed in the reagent compartment. The moving mechanism is configured to move the shutter to an overlay position opposing the opening and separated from the opening before moving the shutter downward so as to close off the opening, and is also configured to move the shutter, which is closing off the opening, upward to open up the opening before withdrawing the shutter from the overlay position over the opening.

A reagent storage device of the present disclosure may be configured such that the moving mechanism: includes a guide member provided with an inclined portion inclined with respect to an opening plane of the opening, and a linear portion contiguous to the inclined portion and running parallel to the opening plane of the opening; is configured to open up the opening by moving the shutter obliquely upward along the inclined portion; is configured to move the shutter to the overlay position opposing the opening, and to withdraw the shutter from the overlay position, by moving the shutter in a horizontal direction along the linear portion; and is configured to close off the opening by moving the shutter obliquely downward along the inclined portion.

A reagent storage device of the present disclosure may be configured such that the moving mechanism includes at least one drive source configured to generate drive force to drive the shutter, and a drive force transmission section attached to the shutter and configured to transmit drive force from the drive source to the shutter.

A reagent storage device of the present disclosure may be configured such that the drive force transmission section includes a first drive force transmission section configured to move the shutter to the overlay position over the opening and to withdraw the shutter from the overlay position over the opening, and a second drive force transmission section configured to move the shutter downward and upward.

A reagent storage device of the present disclosure may be configured such that the drive force transmission section includes one or more bearings provided on each of two side faces with respect to a movement direction of the shutter, and a guide member configured to guide the bearings, the guide member including an inclined portion inclined upward from the opening and a linear portion running parallel to an opening plane of the opening.

A reagent storage device of the present disclosure may be configured such that the shutter is provided with a buffer member on a face of the shutter on a side opposing the opening of the reagent compartment in a case in which the opening is closed off by the shutter.

A reagent storage device of the present disclosure may be configured such that an outer surface of at least one of a bottom face or a side face of the reagent compartment is cooled by a cooling source.

A reagent storage method of the present disclosure is a storage method for storing a reagent in a reagent storage device including a shutter configured to open and close an opening in a reagent compartment for housing a reagent container, the reagent compartment being provided with the opening for insertion and removal of a probe used to extract a reagent from inside the reagent container housed in the reagent compartment. The reagent storage method includes: enabling insertion and removal of the probe through the opening to extract the reagent from inside the reagent container by moving the shutter, which is closing off the opening, upward to open up the opening before withdrawing the shutter from an overlay position over the opening; and shutting the reagent compartment and storing the reagent by moving the shutter to the overlay position opposing the opening and separated from the opening before moving the shutter downward to close off the opening.

A shutter of the present disclosure is configured to open and close an opening in a reagent compartment for housing a reagent container, the reagent compartment being provided with the opening for insertion and removal of a probe used to extract a reagent from inside the reagent container housed inside the reagent compartment. The shutter is configured to move to an overlay position opposing the opening and separated from the opening before moving downward so as to close off the opening, and to move upward from a closed state to open up the opening before withdrawing from the overlay position over the opening.

Effects of Invention

The present disclosure enables the efficacy of a reagent inside an open reagent container housed in a reagent compartment to be maintained for a longer duration in the reagent container than in cases in which an opening in a reagent compartment is always open.

DESCRIPTION OF EMBODIMENTS

Figure 1:
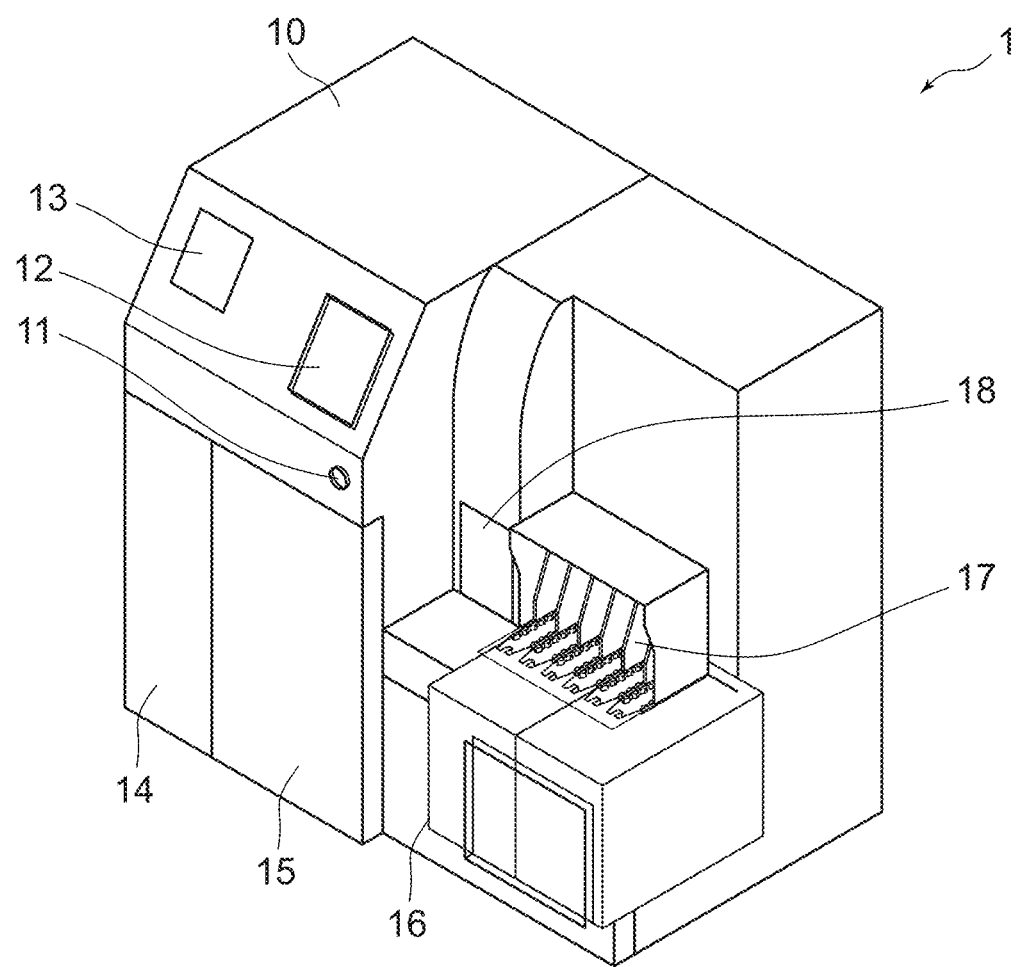
FIG. 1 is an external view of an automatic analysis device configuring an exemplary embodiment of the present disclosure.
Figure 2:
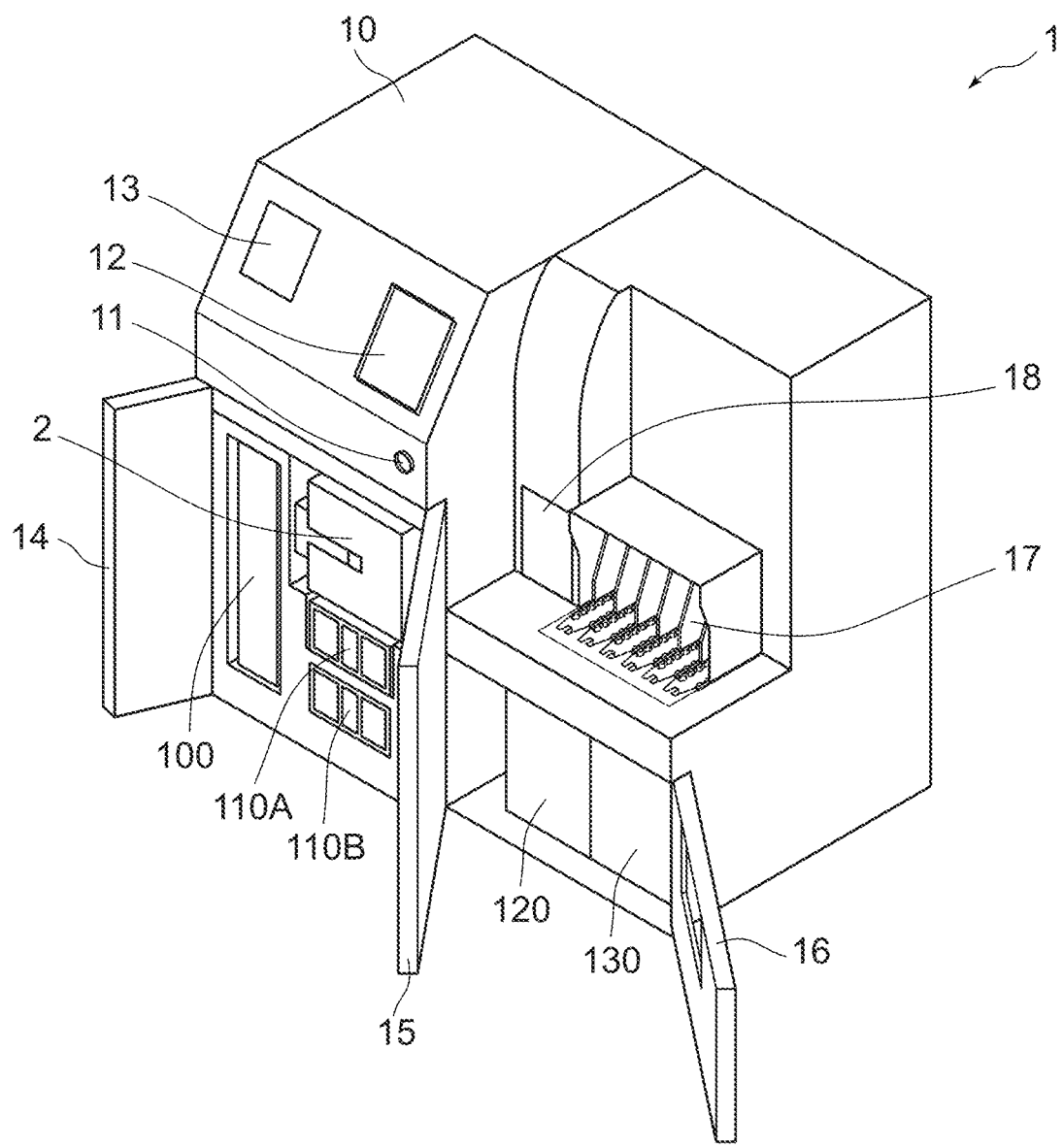
FIG. 2 is an external view of the automatic analysis device in FIG. 1 in a state in which in which front doors have been opened.

Explanation follows regarding an exemplary embodiment of the present disclosure, with reference to the drawings. An automatic analysis device serving as an exemplary embodiment of the present disclosure is, for example, an immunoassay device or a biochemical analysis device used to measure a predetermined aspect of a measurement sample produced by mixing together a specimen obtained from a test subject and a reagent, and analyze the specimen based on the measurement results. FIG. 1 is an external view of an automatic analysis device according to an exemplary embodiment of the present disclosure. FIG. 2 is an external view of the automatic analysis device in FIG. 1 when doors are in an open state. Note that for the sake of convenience, in FIG. 1 the near side of the page is referred to as the front of an automatic analysis device 1, and the left side of the page is referred to as the left side of the automatic analysis device 1.

As illustrated in FIG. 1, the automatic analysis device 1 includes a power indicator switch 11 to display a power state, a display section 12 formed by a touch panel for performing various operation and display, and a printing section 13 for printing measurement results and analysis results, these being provided at the top-left of a front face of a device body 10. A left door 14, a center door 15, and a right door 16 are provided at the bottom of the front face of the device body 10. A sample rack 17 in which samples to be measured are held, and a cleaning fluid section 18 in which cleaning fluid is held are provided above the right door 16.

As illustrated in FIG. 2, opening the left door 14, the center door 15, and the right door 16 reveals a chip station 100 housing plural chips in which a reagent and specimen are to be dispensed using a probe provided inside the automatic analysis device 1, disposed behind the left door 14, and a reagent compartment 2, in which a reagent is held, and air filters 110A, 110B, disposed behind the center door 15. A waste liquid vessel 120 and a purified water vessel 130 are disposed behind the right door 16.

The automatic analysis device 1 performs an automatic operation sequence to dispense the reagent and the specimen using a probe and then perform cleaning and the like. Note that in the automatic analysis device 1 of the present disclosure, detailed explanation follows regarding only the reagent compartment 2 of the technology disclosed herein, and explanation regarding other components will be omitted.

Figure 3:
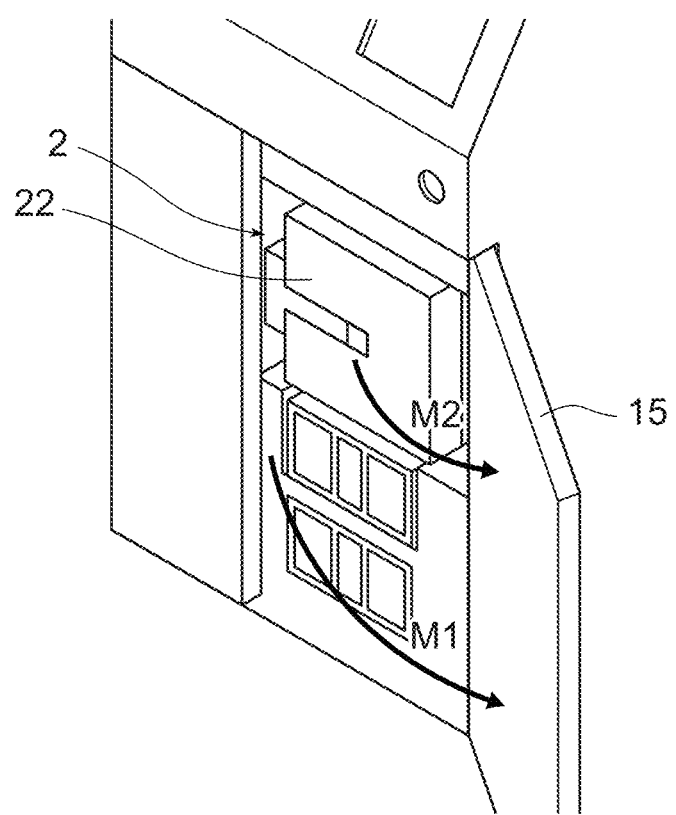
FIG. 3 is an enlarged view of the automatic analysis device in FIG. 1 in a state in which a center door has been opened.
Figure 4:
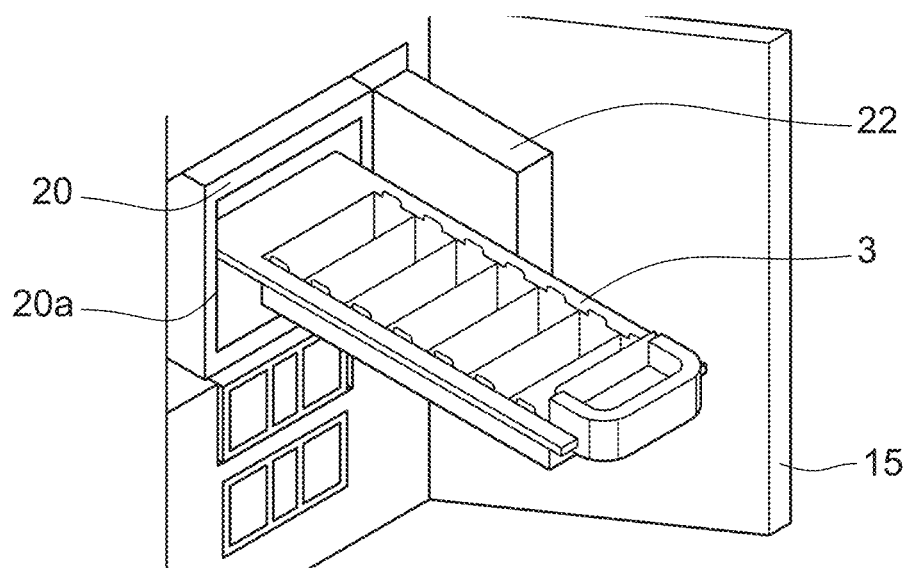
FIG. 4 is a diagram illustrating a state in which a front door of a reagent compartment has been opened.

Detailed explanation follows regarding the reagent compartment 2 of an exemplary embodiment of the present disclosure. FIG. 3 is an enlarged view of a state in which the center door 15 of the automatic analysis device 1 illustrated in FIG. 1 is open. FIG. 4 is a diagram illustrating a state in which a front door 22 of the reagent compartment 2 is open.

As illustrated in FIG. 3, a user opens the center door 15 of the automatic analysis device 1 in the arrow M1 direction to reveal the reagent compartment 2 housed in an upper section therein. The user opens the front door 22 of the reagent compartment 2 in the arrow M2 direction to reveal an opening 20*a* provided in a front face of a reagent compartment body 20, as illustrated in FIG. 4. The user is able to insert and remove a reagent tray 3 through the opening 20*a*. Note that an outer surface of a bottom face of the reagent compartment 2 is cooled by a non-illustrated cooling source inside the automatic analysis device 1 in order to cool the reagent held inside the reagent compartment 2. The cooling source is not limited to cooling the bottom face of the reagent compartment 2, and modification may be made as appropriate such that the cooling source cools a side face or upper face of the reagent compartment 2, or cools a combination of the bottom face, side face, and upper face of the reagent compartment 2.

Figure 5:
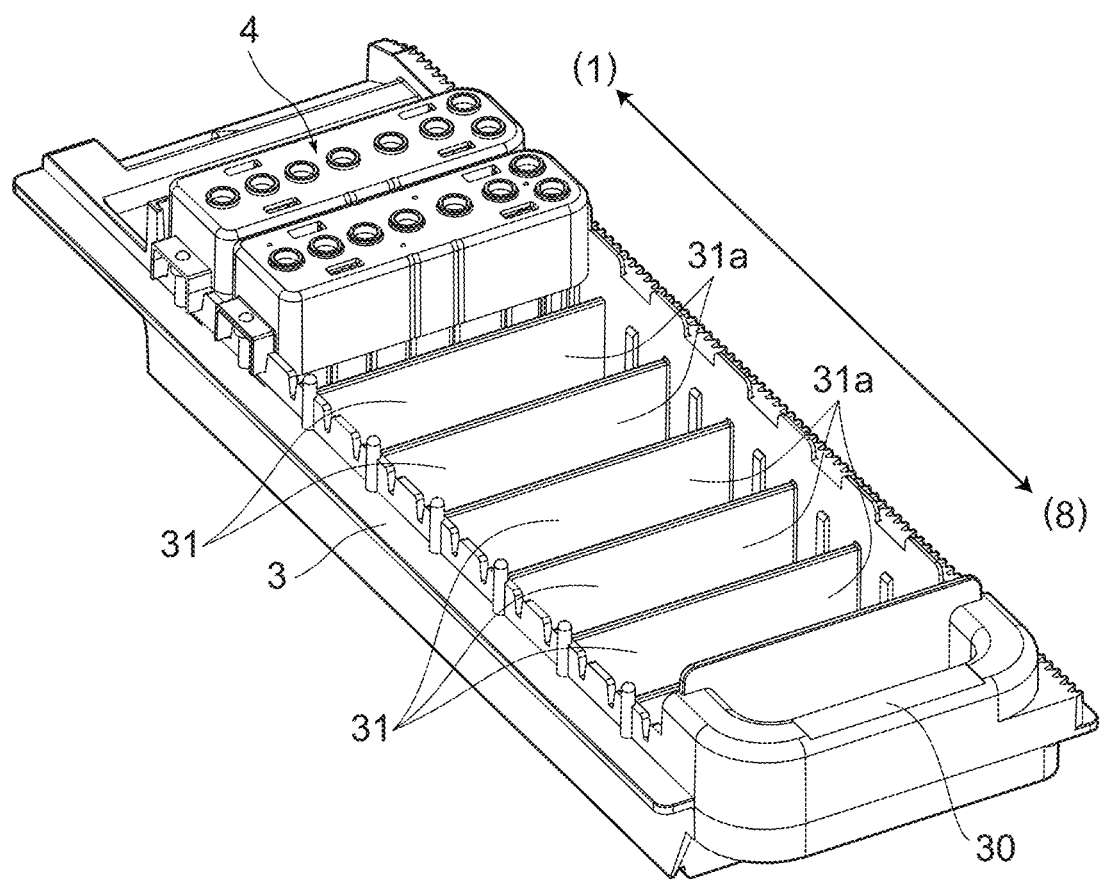
FIG. 5 is a perspective view illustrating a reagent tray.

FIG. 5 is a perspective view illustrating the reagent tray 3. The reagent tray 3 is formed in a rectangular box shape as illustrated in the example in FIG. 5, and a grip 30 for the user to grip is provided at one end of the reagent tray 3. Seven partitioning plates 31*a* are attached to an upper face of the reagent tray 3 so as to form eight compartments 31 arranged in the length direction. The user houses a reagent container 4, described later, in each of the eight compartments 31. Note that although the reagent tray 3 is configured by a tray provided with the eight compartments 31 in the present disclosure, the technology disclosed herein is not limited thereto, and the number of compartments 31 may be modified as appropriate. Moreover, although the reagent tray 3 is formed with the compartments 31 using the partitioning plates 31*a* in the technology disclosed herein, the technology disclosed herein is not limited thereto, and any configuration may be applied as long as plural reagent containers 4 can be housed.

Figure 6:
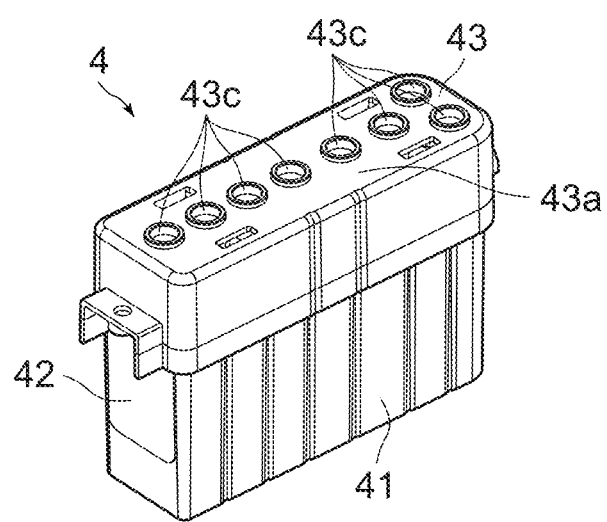
FIG. 6 is a perspective view illustrating a reagent container to which an adaptor is attached.
Figure 7:
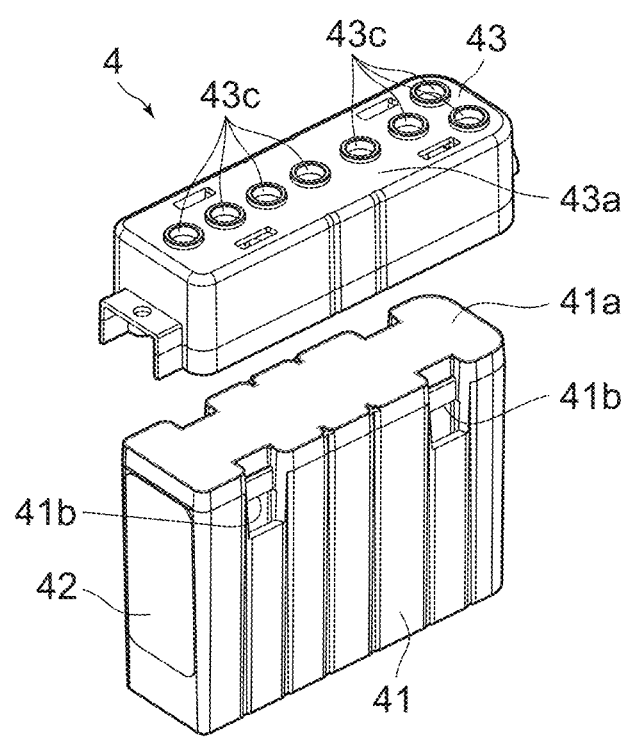
FIG. 7 is an exploded perspective view corresponding to FIG. 6.

FIG. 6 is a perspective view illustrating the reagent container 4, to which an adapter 43 is attached, and FIG. 7 is an exploded perspective view corresponding to FIG. 6. As in the example illustrated in FIG. 6, the reagent container 4 includes a vessel body 41 configuring the reagent container 4, and the adapter 43 serving as a seal-opening member attached onto the vessel body 41. An upper portion of the vessel body 41 is open, and the reagent is held inside the vessel body 41. As in the example illustrated in FIG. 7, the upper opening in the vessel body 41 is sealed by a seal member 41*a* formed from aluminum. Since the opening in the vessel body 41 is sealed by the seal member 41*a*, the reagent held inside the vessel body 41 does not leak from the vessel body 41 during transit, and the vessel body 41 is therefore easy to handle. The material employed for the seal member 41*a* may be a thin film such as an aluminum foil, or may have a layered structure in which both surfaces or one surface of the aluminum foil is laminated using a resin such as polypropylene.

Two engagement portions 41*b* are provided at an upper side of each of two side faces with respect to a length direction of the vessel body 41. Each of the engagement portions 41*b* is formed with an insertion hole for insertion of an engagement claw of the adapter 43, described later. An information tag 42 is also attached to one length direction side face of the vessel body 41. The information tag 42 is an electronic device stored with any desired information, and such information can be written and read by application of electromagnetic waves. The information tag 42 of the present disclosure is stored with various information used to identify the reagent held in the vessel body 41.

As in the example illustrated in FIG. 6 and FIG. 7, the adapter 43 is integrally molded from a synthetic resin and includes a body 43*a* extending so as to cover the upper face of the vessel body 41, and eight tube shaped piercing holes 43*c* projecting downward from a lower face of the body 43*a*. Note that the eight piercing holes 43*c* penetrate the body 43*a* from an upper face to the lower face of the body 43*a*. A planar direction dimension of the body 43*a* of the adapter 43 is substantially the same as a planar direction dimension of the vessel body 41. The piercing holes 43*c* are arranged along the length direction of the adapter 43 so as to be arrayed in a row of six and two rows of one. Note that although eight of the piercing holes 43*c* are arrayed as described above in the technology disclosed herein, the technology disclosed herein is not limited thereto, and the number and array method of the piercing holes 43*c* may be modified as appropriate.

The piercing holes 43*c* of the adapter 43 are formed with thin tipped tube portions projecting downward from the lower face of the body 43*a*. Accordingly, the seal member 41*a* sealing the vessel body 41 is broken by the thin tipped tube portions of the piercing holes 43*c* when the adapter 43 is attached to the vessel body 41. Breaking the seal member 41*a* places the interior of the vessel body 41 in communication with the piercing holes 43*c* of the adapter 43, allowing a probe used to extract the reagent access to the reagent held inside the vessel body 41 through the upper face of the adapter 43.

Elastic engagement claws (not illustrated in the drawings) are provided on two side faces with respect to the length direction, at an inner side of the adapter 43 at positions corresponding to the engagement portions 41*b* of the vessel body 41. When attaching the adapter 43 to the vessel body 41, the engagement claws are inserted into the engagement portions 41*b* while being elastically deformed inward. The engagement claws return to their original state after insertion into the engagement portions 41*b*, and thereby hook onto the corresponding engagement portions 41*b*. The engagement between the engagement portions 41*b* and the engagement claws enables the adapter 43 to be attached to the vessel body 41.

As illustrated in the example in FIG. 4, when the adapter 43 has been attached as described above and the piercing holes 43*c* are in communication with the interior of the vessel body 41 of the reagent container 4, namely when the reagent container 4 has been unsealed, the user houses the reagent container 4 in one of the compartments 31 of the reagent tray 3, before inserting the reagent container 4 together with the reagent tray 3 into the reagent compartment 2 through the opening 20*a*. Note that although an example in which the adapter 43 is attached to the reagent container 4 is given in the technology disclosed herein, the technology disclosed herein is not limited thereto. For example, an adaptor may be integrally formed to a reagent container. Any configuration may be adopted as long as a probe used to extract the reagent is able to access the reagent held inside the reagent container.

Figure 15:
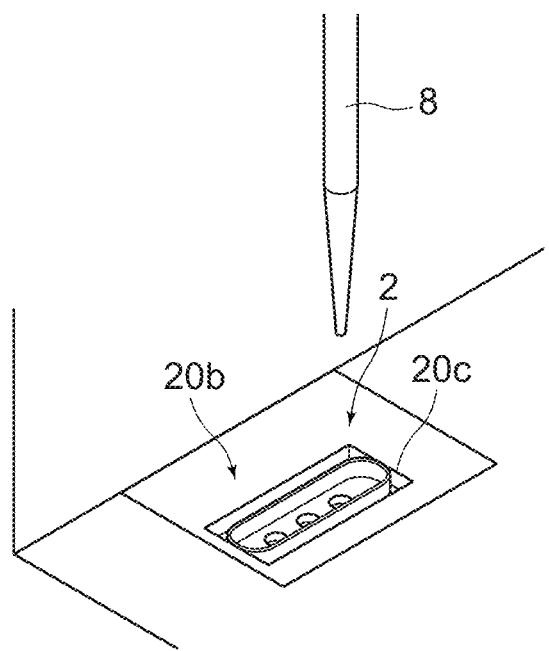
FIG. 15 is a diagram to explain configuration of an upper portion of a conventional reagent compartment.

After placing the unsealed reagent container 4 in the reagent compartment 2, conventionally, the reagent container 4 would then generally be held for around 30 to 45 days in a state cooled inside the reagent compartment 2 for the reagent inside the reagent container 4 to be used in analysis. In a conventional automatic analysis device, the interior of the reagent compartment 2 would be cooled. However, as illustrated in FIG. 15, since an opening 20*c* configuring part of the reagent compartment 2 is always open, there is a constant flow of external air into the reagent compartment 2. Such air that has flowed into the reagent compartment 2 is cooled, thus forming condensation. Due to the presence of the piercing holes 43*c* in an upper portion of the reagent container 4, air may flow into the reagent container 4 causing condensation which might mix with the reagent to form inside the reagent container 4. If condensation becomes mixed with the reagent, the reagent may be diluted, or the reagent may deteriorate prematurely. This makes it difficult for the reagent to remain effective over a long duration.

Figure 8:
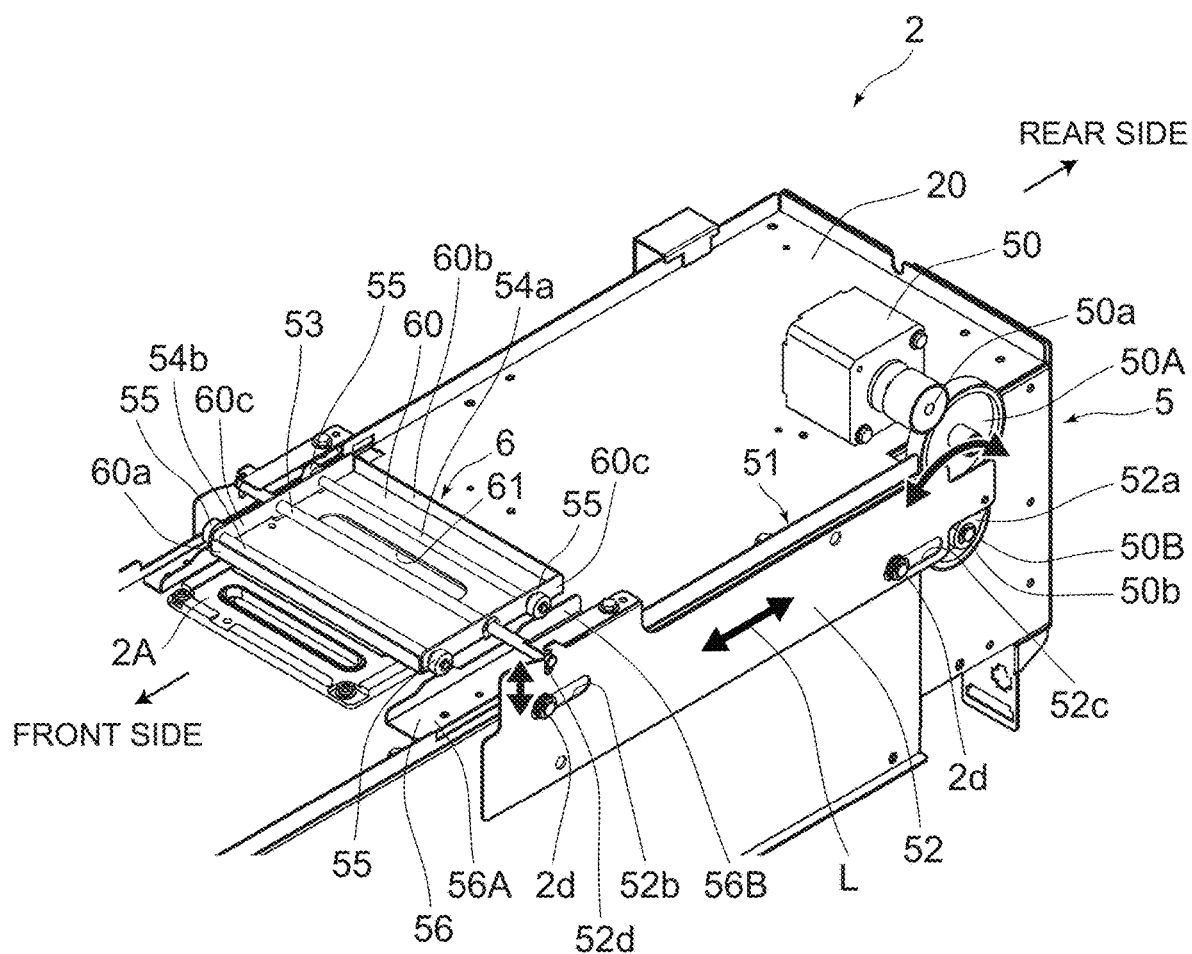
FIG. 8 is a perspective view illustrating a shutter at an upper portion of a reagent compartment (in an open state).
Figure 9:
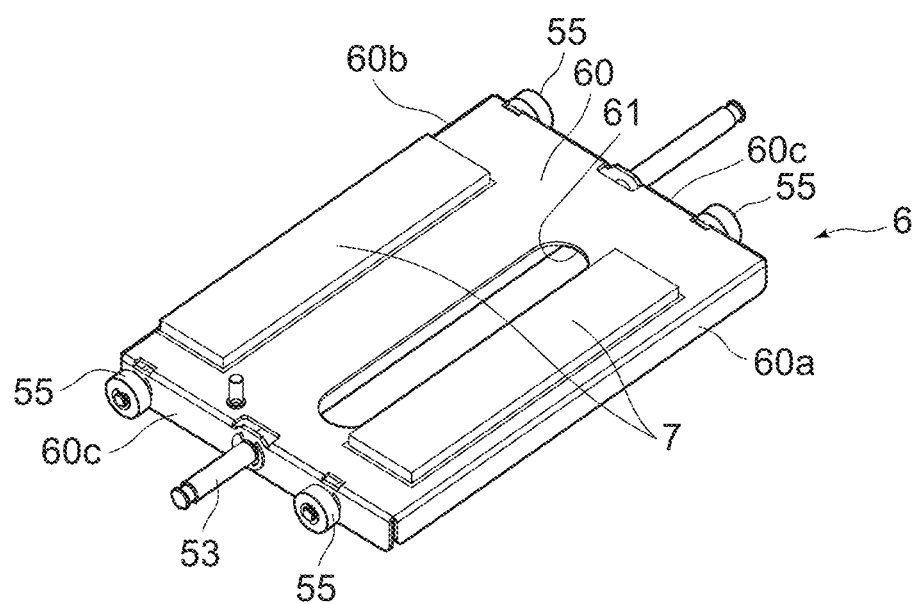
FIG. 9 is a perspective view illustrating a back face of a shutter.
Figure 10:
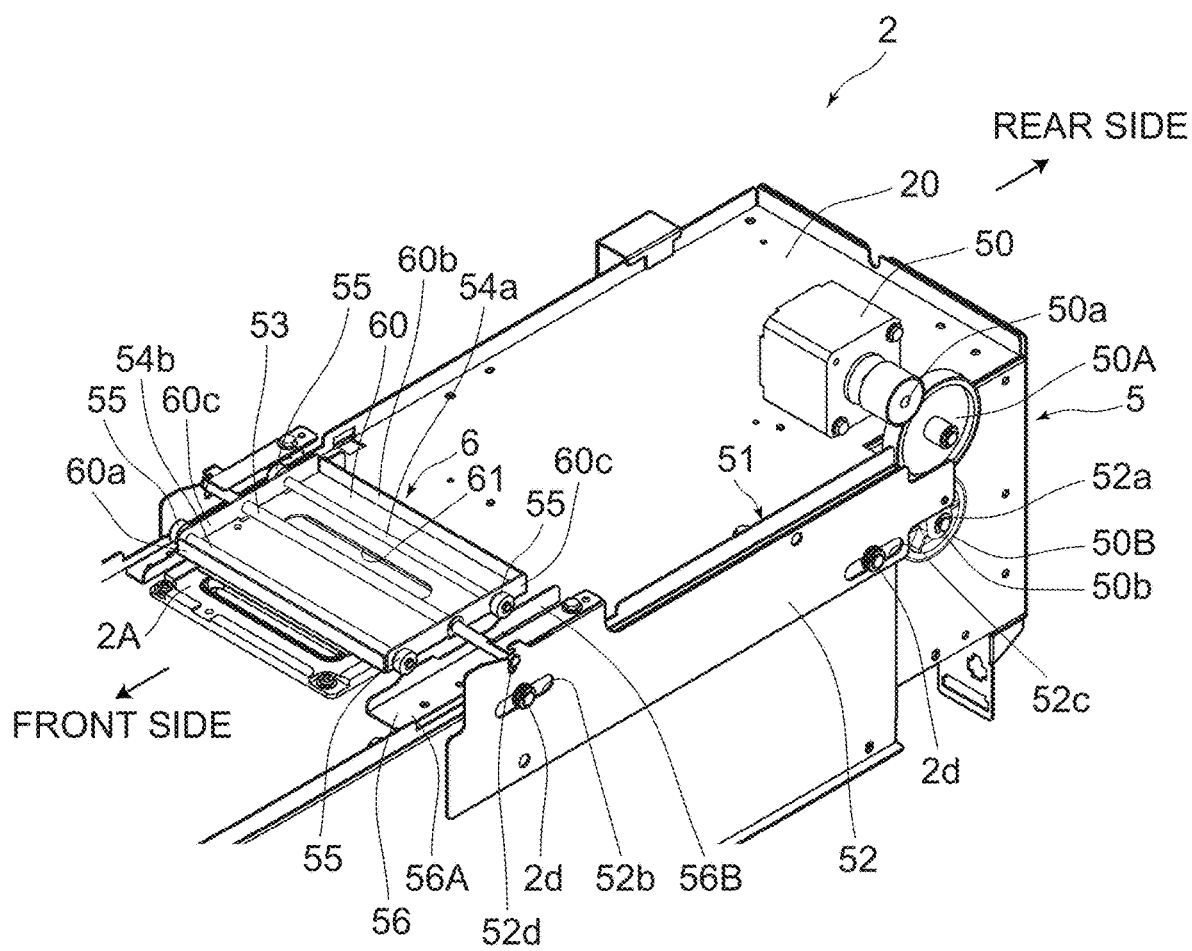
FIG. 10 is a perspective view illustrating a shutter at an upper portion of a reagent compartment (in a partially open/closed state).
Figure 11:
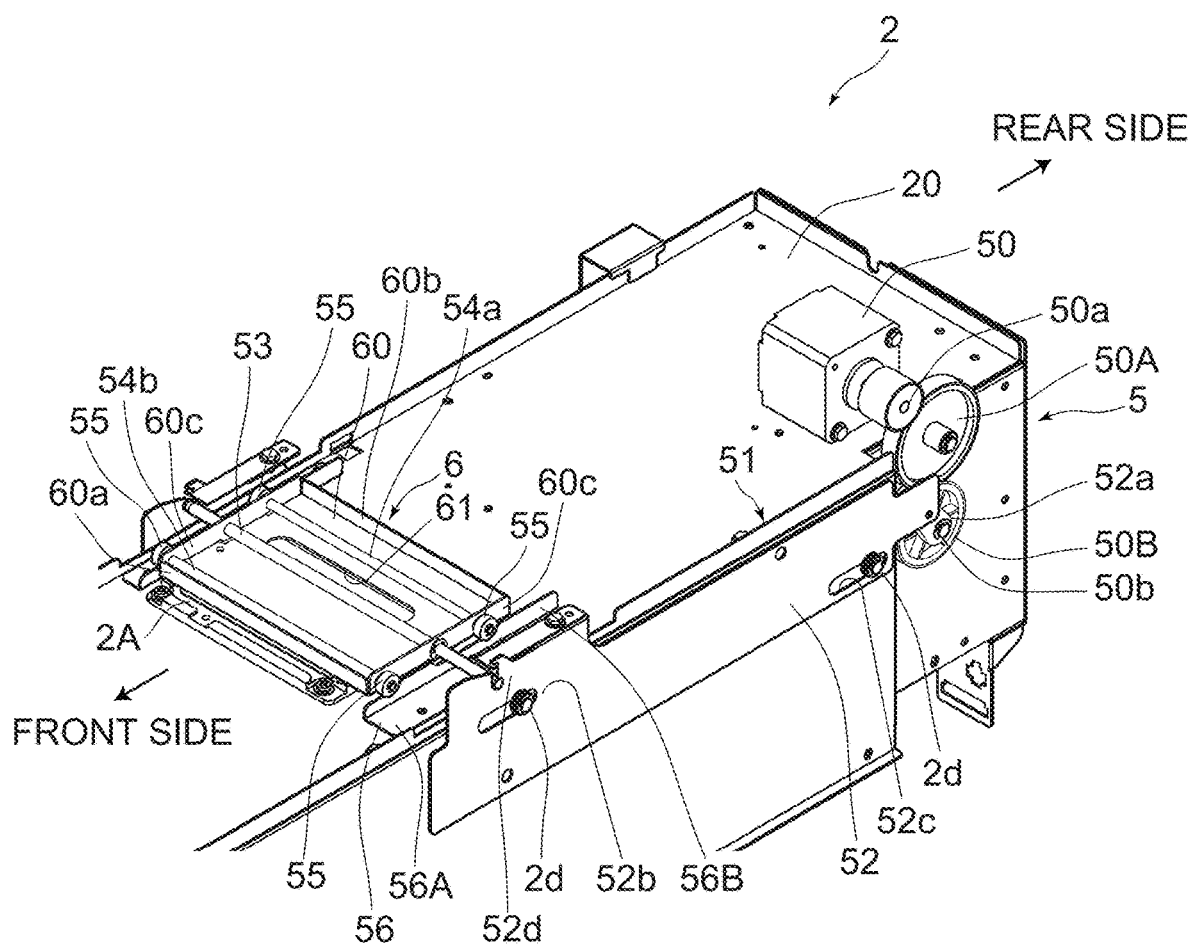
FIG. 11 is a perspective view illustrating a shutter at an upper portion of a reagent compartment (in a closed state).
Figure 12:
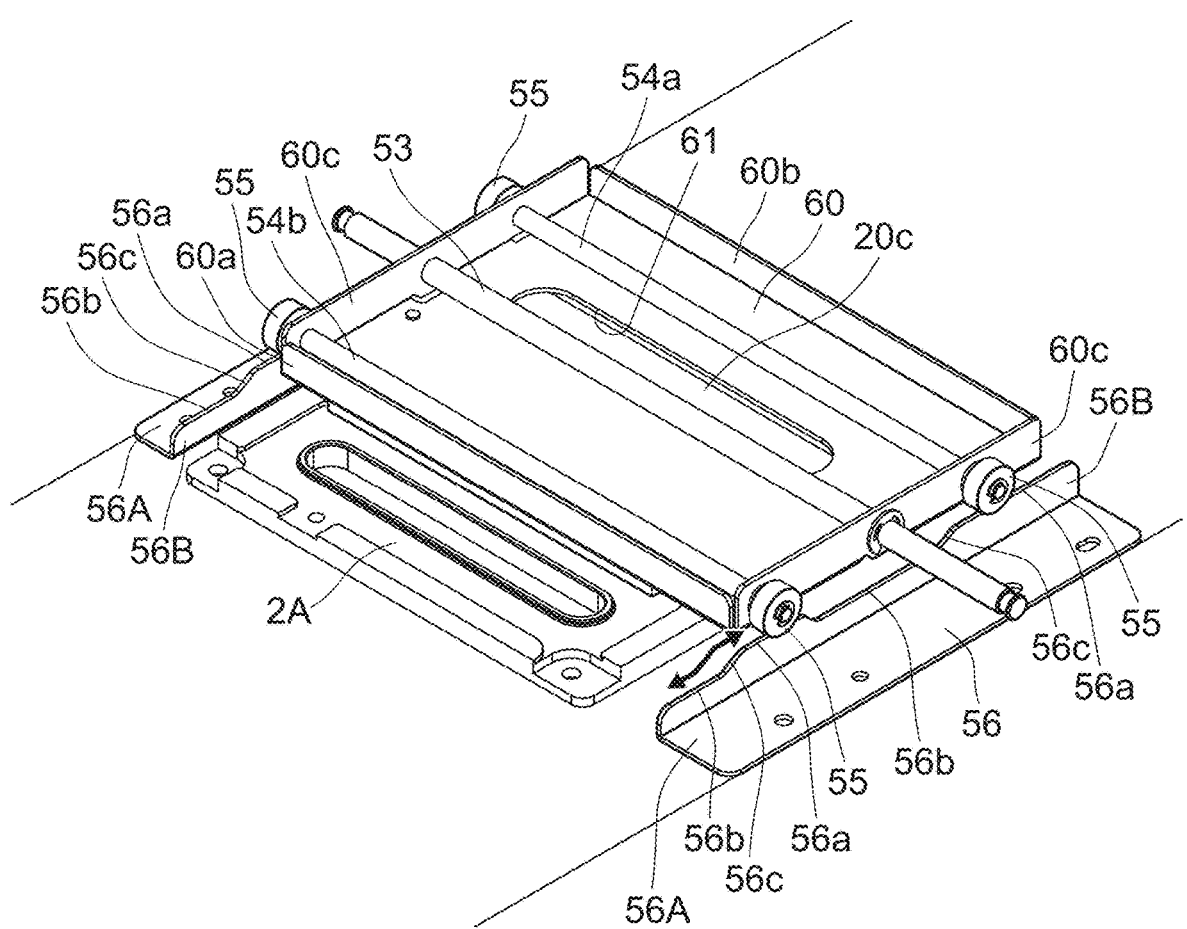
FIG. 12 is a perspective view to explain an open state of a shutter.
Figure 13:
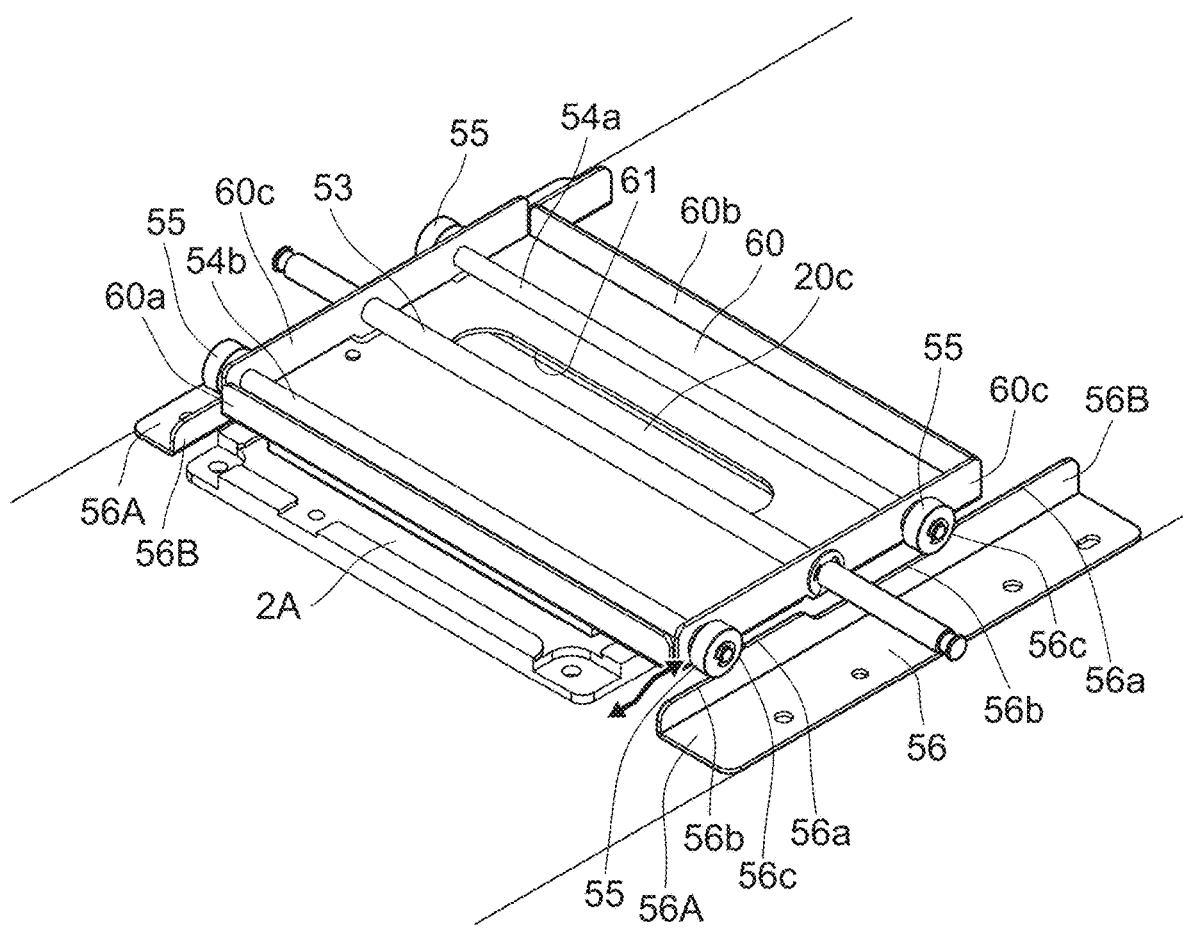
FIG. 13 is a perspective view to explain a partially open/closed state of a shutter.
Figure 14:
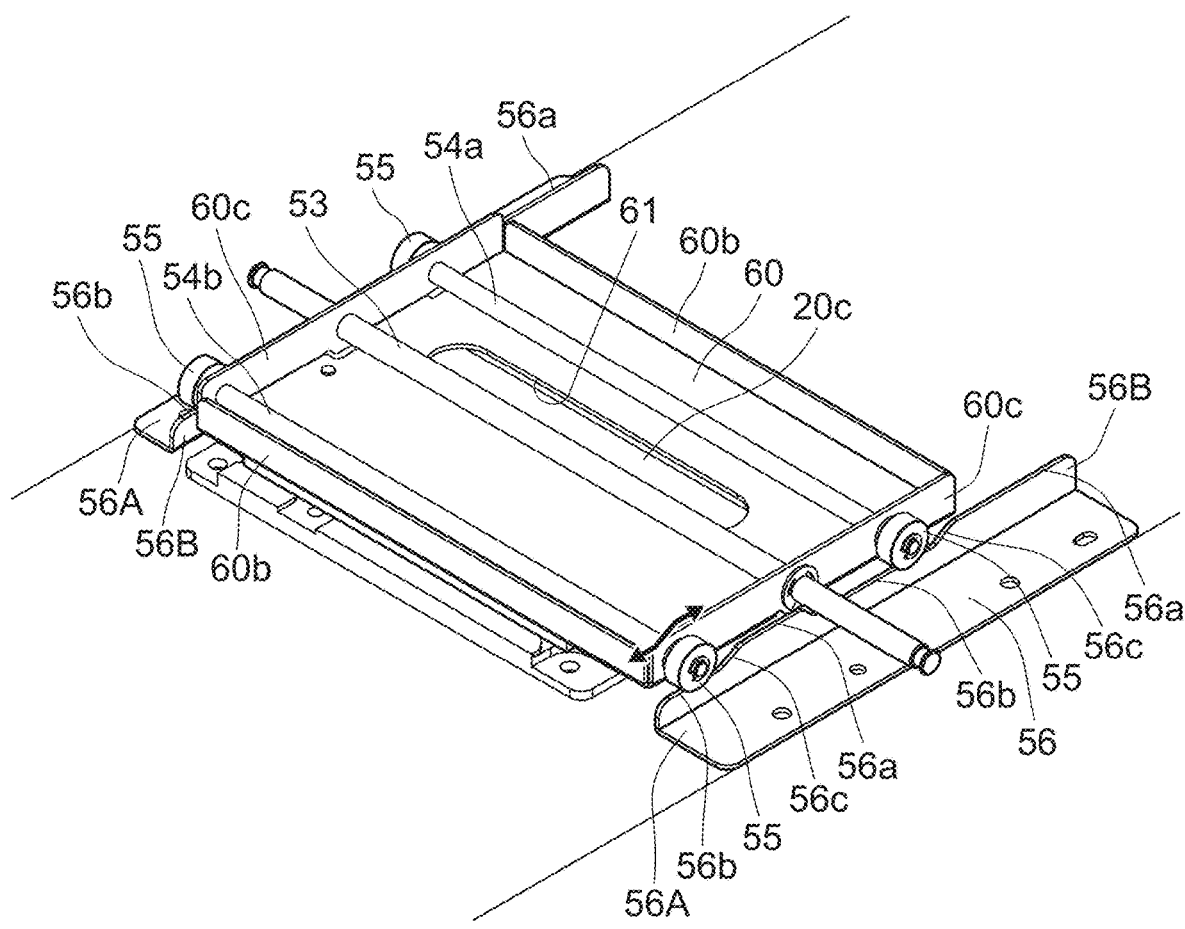
FIG. 14 is a perspective view to explain a closed state of a shutter.

However, in the automatic analysis device 1 of the present disclosure, a shutter 6 is provided to open and close the opening 20c in the reagent compartment 2. FIG. 8 is a perspective view illustrating the shutter 6 at an upper portion of the reagent compartment 2 (in an open state). FIG. 9 is a perspective view illustrating a back face of the shutter 6. FIG. 10 is a perspective view illustrating the shutter 6 at the upper portion of the reagent compartment 2 (in a partially open/closed state). FIG. 11 is a perspective view illustrating the shutter 6 at the upper portion of the reagent compartment 2 (in a closed state). FIG. 12 is a perspective view to explain the open state of the shutter 6. FIG. 13 is a perspective view to explain partial opening/closing of the shutter 6. FIG. 14 is a perspective view to explain the closed state of the shutter 6. Note that in FIG. 8 and in FIG. 10 to FIG. 14, the side of the reagent compartment 2 to which the shutter 6 is attached is referred to as the upper portion of the reagent compartment 2, and the reagent compartment 2 is attached to the automatic analysis device 1 with the upper portion on the upper side. In FIG. 8 and FIG. 10 to FIG. 14, the left side of the page corresponds to a front face side of the reagent compartment 2. Although the shutter 6 is installed inside the automatic analysis device 1 in reality, for the sake of convenience only the reagent compartment 2 and relevant components attached to the reagent compartment 2 are illustrated in FIG. 8 and in FIG. 10 to FIG. 14 and explained in detail.

As illustrated in the example in FIG. 8, the automatic analysis device 1 of the present disclosure includes the reagent compartment 2, the shutter 6, and a moving mechanism 5 to move the shutter 6. In the present disclosure, the shutter 6 and the moving mechanism 5 configure a reagent storage device. The reagent compartment 2 internally houses the reagent container 4. A probe 8 (see FIG. 15) is installed inside the automatic analysis device 1. The probe 8 extracts and discharges the reagent in the reagent container 4 housed in the reagent compartment 2, as well as a measurement sample. The reagent compartment 2 includes the opening 20c, and the probe 8 is inserted and removed through the opening 20c.

As illustrated in FIG. 8 and FIG. 9, the shutter 6 includes a rectangular shutter body 60. The shutter 6 also includes a front face 60a and a rear face 60b, respectively extending upward from two ends of the shutter body 60 that run along the length direction of the reagent compartment 2 when the shutter 6 has been attached to the reagent compartment 2. The shutter 6 further includes respective side faces 60c extending upward from both sides in the length direction of the reagent compartment 2. The shutter body 60 includes an elongated shutter hole 61 running along the length direction of the reagent compartment 2. When the elongated shutter hole 61 and the opening 20c in the reagent compartment 2 overlap, the shutter 6 is the open state. Note that although an example in which the shutter 6 is provided with the elongated shutter hole 61 is given in the technology disclosed herein, the technology disclosed herein is not limited thereto. For example, in cases in which one opening 20c is provided in the reagent compartment 2, or in cases in which plural openings 20c are arrayed in the reagent compartment 2 in a row and opening and closing of the plural openings 20c in the row are not coordinated, the elongated shutter hole 61 in the shutter 6 may be omitted. The shutter 6 may have any shape that is capable of closing off the opening 20c.

As illustrated in the example in FIG. 9, a back face of the shutter body 60, namely a face on a side opposing the opening 20c when the shutter 6 closes off the opening 20c in the reagent compartment 2, is provided with rectangular buffer members 7 extending in a direction along the front face 60a and the rear face 60b. As an example, the buffer members 7 are formed from silicone sponge. Note that the buffer members 7 are members used to absorb shock when the shutter body 60 abuts the reagent compartment 2, and the shape and materials employed therefor are not particularly limited as long as the buffer members 7 are members that are capable of absorbing shock.

The moving mechanism 5 is a mechanism to move the shutter 6 upward to an overlay position opposing the opening 20c and separated from the opening 20c in the reagent compartment 2, before moving the shutter 6 downward so as to close off the opening 20c. The moving mechanism 5 also moves the shutter 6 that is closing off the opening 20c upward to open up the opening 20c, before withdrawing the shutter 6 in a sideways direction from the overlay position over the opening 20c.

Specifically, the moving mechanism 5 includes a motor 50 serving as a drive source that generates drive force to drive the shutter 6, and a drive force transmission section 51 that is attached to the shutter 6 and transmits the drive force from the motor 50 to the shutter 6.

As illustrated in the example in FIG. 8, the drive force transmission section 51 of the present disclosure includes a first gear 50A that rotates synchronously with a shaft 50a of the motor 50, and a second gear 50B that rotates synchronously with the first gear 50A. Teeth provided around the shaft of the motor 50 mesh with teeth provided to an outer peripheral face of the first gear 50A, and teeth provided to the outer peripheral face of the first gear 50A mesh with teeth provided to an outer peripheral face of the second gear 50B.

The drive force transmission section 51 further includes a transmission member 52 configured by an elongated plate, and a coupling member 52a that has one end coupled to one end of the transmission member 52 and has another end coupled to a shaft 50b of the second gear 50B so as to rotate synchronously with the second gear 50B. Note that another coupling member 52a that is coupled to the shaft 50b of the second gear 50B is also provided to a side face of the reagent compartment 2 on the far side of the page in FIG. 8. In the example illustrated in FIG. 8, the side face of the reagent compartment 2 on the far side of the page is configured similarly to the near side of the page. For the sake of convenience, explanation is given regarding only configuration on the near side of the page, and explanation regarding configuration on the far side of the page will be omitted.

As illustrated in the example in FIG. 8, the transmission member 52 is provided with elongated holes 52b, 52c toward the top-front side and the bottom-rear side of the reagent compartment 2 respectively. Respective projections 2d projecting from the side face of the reagent compartment 2 are inserted through and move within the respective elongated holes 52b, 52c so as to guide movement of the transmission member 52.

The drive force transmission section 51 includes a shutter shaft 53 that is inserted through and fixed to holes respectively provided in the two opposing side faces 60c of the shutter 6. As illustrated in FIG. 8, the shutter shaft 53 is inserted through upright elongated holes 52d each provided at an upper end of the transmission member 52. Horizontal direction movement of the shutter shaft 53 is thus restricted, permitting movement of the shutter shaft 53 in a height direction only. Note that the upright elongated holes 52d are partially cut away to allow the shutter shaft 53 to enter and leave the upright elongated holes 52d.

The drive force transmission section 51 further includes bearing shafts 54a, 54b inserted through and fixed to respective holes provided in the two opposing side faces 60c of the shutter 6. Bearings 55 are attached to both ends of each of the bearing shafts 54a, 54b.

The drive force transmission section 51 further includes a guide member 56 at the upper face of the reagent compartment 2. As illustrated in FIG. 8, the guide member 56 includes an attachment portion 56A that is attached to the upper face of the reagent compartment 2, and a guide portion 56B that extends upward at approximately 90° from one end of the attachment portion 56A. As illustrated in FIG. 12, an upper end of the guide portion 56B is formed with two trapezoidal shapes, and is provided with parallel linear portions 56a, 56b at different heights to each other relative to the upper face of the reagent compartment 2, namely relative to an opening plane of the opening 20c, and inclined portions 56c linking the linear portions 56a and the linear portions 56b together. In a state in which the bearings 55 are positioned on the upper linear portions 56a as illustrated in FIG. 8 and FIG. 12, the shutter 6 and the buffer members 7 are positioned at a position separated from the upper face of the reagent compartment 2. In such a state, the shutter 6 places the opening 20c in the open state depending on the linear direction position of the bearings 55 on the linear portions 56a. In a state in which the bearings 55 are positioned on the lower linear portions 56b as illustrated in FIG. 11 and FIG. 14, the shutter 6 and the buffer members 7 abut the upper face of the reagent compartment 2, and the shutter 6 places the opening 20c in the closed state.

Although the guide member 56 has the above-described shape as an example in the technology disclosed herein, the technology disclosed herein is not limited thereto. The guide member 56 may have any shape as long as it is capable of guiding the bearings 55 in a manner enabling the shutter 6 to be moved between a position separated from the upper face of the reagent compartment 2 and a position abutting the upper face of the reagent compartment 2, and enabling the shutter 6 to be moved to place the opening 20c in the open state and the shut state. Although the automatic analysis device 1 is provided with two bearing shafts and four bearings in the present disclosure, the present disclosure is not limited thereto, and the numbers of bearing shafts and bearings may be modified according to the size of the shutter 6.

Explanation follows regarding opening and closing operations of the shutter 6 by the moving mechanism 5 configured as described above. First, explanation follows regarding an operation to close the shutter 6 when the shutter 6 is in the open state. As illustrated in FIG. 8, in the open state of the shutter 6, the bearings 55 are positioned on the upper side linear portions 56a. In this state, the elongated shutter hole 61 and the opening 20c in the reagent compartment 2 are in an overlapping state, and the probe 8 used to extract the reagent is able to access the reagent held inside the reagent container 4 through the opening 20c in the upper face of the reagent compartment 2.

When the probe 8 has finished extracting the reagent, a non-illustrated control section instructs the start of the operation to close the shutter 6. In response to this instruction from the control section, the motor 50 is driven so as to rotate the first gear 50A and the second gear 50B through the shaft of the motor 50. When the second gear 50B rotates, the transmission member 52 is moved toward the left side in the arrow L direction in FIG. 8 through the coupling member 52a. When this occurs, the bearings 55 move over the respective linear portions 56a toward the left and the shutter body 60 moves toward the overlay position opposing the opening 20c. Namely, the overlapping state of the elongated shutter hole 61 and the opening 20c in the reagent compartment 2 transitions to a non-overlapping state. The linear portions 56a in the present disclosure correspond to a first drive force transmission section.

The motor 50 is driven further so as to move the transmission member 52 toward the left side in the arrow L direction in FIG. 8, such that the bearings 55 move obliquely downward along the inclined portions 56c as illustrated in FIG. 10 and FIG. 13. When this occurs, the shutter shaft 53 moves downward within the upright elongated holes 52d provided in the upper end of the transmission member 52 according to the incline of the inclined portions 56c, causing the shutter 6 to approach the reagent compartment 2. Note that in the present disclosure, the shutter body 60 is positioned at a withdrawn position with respect to the opening 20c immediately prior to the bearings 55 moving onto the respective inclined portions 56c. Namely, a state has arisen in which the elongated shutter hole 61 and the opening 20c in the reagent compartment 2 are not overlapping each other.

The bearings 55 then move obliquely downward along the inclined portions 56c, causing the shutter body 60 to move downward and approach the opening 20c. When the bearings 55 move beyond the inclined portions 56c so as to be positioned on the lower side linear portions 56b, as illustrated in FIG. 11 and FIG. 14, the shutter body 60 shuts off the opening 20c while the state in which the elongated shutter hole 61 is not overlapping the opening 20c of the reagent compartment 2 is maintained. In the present disclosure, the inclined portions 56c correspond to a second drive force transmission section.

Next, explanation follows regarding an operation to open the shutter 6 when the shutter 6 is in the closed state. As illustrated in FIG. 11, in the closed state of the shutter 6, the bearings 55 are positioned on the lower side linear portions 56b. In this state, the shutter body 60 closes off the opening 20c, namely, the elongated shutter hole 61 and the opening 20c in the reagent compartment 2 are not overlapping each other. The probe 8 used to extract the reagent is therefore unable to access the reagent held inside the reagent container 4 through the opening 20c in the upper face of the reagent compartment 2.

When the probe 8 is due to start extracting the reagent, the non-illustrated control section instructs the start of the operation to open the shutter 6. In response to this instruction from the control section, the motor 50 is driven so as to rotate the first gear 50A and the second gear 50B through the shaft of the motor 50. When the second gear 50B rotates, the transmission member 52 is moved toward the right side through the coupling member 52a. When this occurs, the bearings 55 move obliquely upward along the inclined portions 56c as illustrated in FIG. 10 and FIG. 13. When this occurs, the shutter shaft 53 moves upward within the upright elongated holes 52d provided in the upper end of the transmission member 52 following the incline of the inclined portions 56c, such that the shutter 6 separates from the reagent compartment 2.

The motor 50 is driven further so as to move the transmission member 52 toward the right, such that the bearings 55 ascend the respective inclined portions 56c so as to be positioned on the upper side linear portions 56a. When this occurs, the shutter 6 moves upward and separates further from the opening 20c.

As illustrated in FIG. 11 and FIG. 14, the bearings 55 move toward the right along the upper side linear portions 56a such that the shutter body 60 withdraws from the overlay position opposing the opening 20c, while the shutter 6 continues to be positioned in a state separated from the opening 20c. Namely, the shutter 6 moves in a direction in which the elongated shutter hole 61 and the opening 20c overlap, so as to adopt a state in which the elongated shutter hole 61 and the opening 20c in the reagent compartment 2 are overlapping each other. This enables the probe 8 employed to extract the reagent to access the reagent held inside the reagent container 4 through the opening 20c in the reagent compartment 2.

Note that in the present disclosure, the shutter body 60 is still positioned above the opening 20c until immediately prior to the bearings 55 moving onto the upper side linear portions 56a. Namely, the elongated shutter hole 61 and the opening 20c in the reagent compartment 2 are placed in an overlapping state.

As described above, in the reagent storage device of the present disclosure, the shutter 6 is moved to the overlay position opposing the opening 20c and at a position separated from the opening 20c, before being moved downward so as to close off the opening 20c. Moreover, the shutter 6 that is closing off the opening 20c is moved upward to open up the opening 20c before being withdrawn from the overlay position over the opening 20c. In the storage method for storing a reagent in the reagent storage device of the present disclosure, insertion and removal of the probe 8 through the opening 20c to extract the reagent from inside the reagent container 4 is enabled by moving the shutter 6 that is closing off the opening 20c upward to open up the opening 20c, before withdrawing the shutter 6 from the overlay position over the opening 20c. Moreover, the reagent compartment 2 is shut and the reagent is stored by moving the shutter 6 to the overlay position opposing the opening 20c and separated from the opening 20c, before moving the shutter 6 downward to close off the opening 20c.

Accordingly, since the opening 20c in the reagent compartment 2 can be closed off by the shutter 6 when the reagent is not being used, condensation may be prevented from mixing with the reagent and diluting the reagent, and premature deterioration of the reagent may be prevented. This enables the efficacy of the reagent to be maintained for a longer duration.

Moreover, since the shutter 6 is both withdrawn from the overlay position and moved to the overlay position over the opening 20c in the reagent compartment 2 at a position separated from the opening 20c in the reagent compartment 2, the shutter 6 may be prevented from rubbing against the opening. This enables the likelihood of any condensation, dust, or the like dropping into the reagent compartment through the opening 20c in the reagent compartment 2 to be reduced.

Hitherto, the degree of reagent dilution has been lessened by increasing the amount of reagent in advance in anticipation of some dilution of the reagent by condensation. However, since the technology disclosed herein reduces the likelihood of condensation mixing in, there is no need to increase the amount of reagent in advance. This enables a reduction in the costs associated with carrying out a single measurement.

The present disclosure is not limited to the above exemplary embodiment, and modifications may be implemented as appropriate within a range not departing from the spirit of the present disclosure.

Although the motor 50 is described as an example of a drive source of the technology disclosed herein in the above exemplary embodiment, the technology disclosed herein is not limited thereto, and a solenoid may be employed instead of the motor 50.

The following supplements are also disclosed in relation to the above exemplary embodiment.

Supplement 1

A reagent storage device (1) including a shutter (6) configured to open and close an opening (20c) in a reagent compartment (2) for housing a reagent container (4), the reagent compartment (2) being provided with the opening (20c) for insertion and removal of a probe (8) used to extract a reagent from inside the reagent container (4) housed in the reagent compartment (2); and a moving mechanism (5) configured to move the shutter (6) to a superimposed position (overlay position) separated from the opening (20c) where a position of the shutter (6) and a position of the opening (20c) are superimposed on each other before lowering the shutter (6) from the superimposed position to a closed position capable of closing off the opening (20c) so as to close off the opening (20c), and also configured to release a closed state of the opening (20c) by the shutter (6) by separating the shutter (6) from the opening (20c) to open up the opening (20c) before withdrawing the shutter (6) from the superimposed position over the opening (20c) to a non-superimposed position.

Here, the superimposed position refers to a position in a state lifted upward from the opening (20c). Namely, when at the superimposed position, the shutter (6) is separated from and above the opening (20c), thus opening up the opening (20c). The closed position is a lower position than the superimposed position, and when the shutter (6) is disposed at the closed position the opening 20c is closed, enabling the incursion of moisture through the opening (20c) to be stopped. Note that the non-superimposed position referred to here refers to a position where the shutter (6) is not superimposed on the opening (20c). An example of the non-superimposed position is a position where the shutter (6) has been slid toward a front side or a rear side of the reagent compartment (2) (a position moved in a sideways direction), referring to a position that is not superimposed on the opening (20c). Moreover, when the shutter (6) is separated from the opening (20c) to open up the opening (20c) in order to release the closed state of the opening (20c) by the shutter (6), the shutter (6) is moved so as to lift the shutter (6) upward from the opening (20c), thereby opening up the opening (20c).

Supplement 2

The reagent storage device (1) of Supplement 1, wherein the moving mechanism (5) includes:

at least one drive source (50) configured to generate drive force to drive the shutter (6); and a drive force transmission section (51) attached to the shutter (6) and configured to transmit drive force from the drive source (50) to the shutter (6).

Supplement 3

The reagent storage device (1) of Supplement 2, wherein the drive force transmission section (51) includes:

a first drive force transmission section (56a) configured to move the shutter (6) to the superimposed position (overlay position) over the opening (20c) and to withdraw the shutter (6) from the superimposed position over the opening (20c) to the non-superimposed position; and a second drive force transmission section (56c) configured to move the shutter between the superimposed position and the closed position.

Supplement 4

A storage method for storing a reagent in a reagent storage device (1) including a shutter (6) configured to open and close an opening (20c) in a reagent compartment (2) for housing a reagent container (4), the reagent compartment (2) being provided with the opening (20c) for insertion and removal of a probe (8) used to extract a reagent from inside the reagent container (4) housed in the reagent compartment (2), the reagent storage method including:

enabling insertion and removal of the probe (8) through the opening (20c) to extract the reagent from inside the reagent container (4) by releasing a closed state of the opening (20c) by the shutter (6) by separating the shutter (6) from the opening (20c) to open up the opening (20c) before withdrawing the shutter (6) from a superimposed position over the opening (20c) to a non-superimposed position; and shutting the reagent compartment (2) and storing the reagent by moving the shutter (6) to the superimposed position (overlay position) separated from the opening (20c) and at a position where a position of the shutter (6) and a position of the opening (20c) are superimposed on each other before moving the shutter (6) downward from the superimposed position to a closed position capable of closing off the opening (20c) so as to close off the opening (20c).

Supplement 5

A shutter (6) configured to open and close an opening (20c) in a reagent compartment (2) for housing a reagent container (4), the reagent compartment (2) being provided with the opening (20c) for insertion and removal of a probe (8) used to extract a reagent from inside the reagent container (4) housed inside the reagent compartment (2), the shutter (6) being configured to:

move to a superimposed position (overlay position) at a position separated from the opening (20c) and superimposed on a position of the opening (20c) before moving downward from the superimposed position to a closed position capable of closing off the opening (20c) so as to close off the opening (20c), and to separate from the opening 20c so as to release a closed state of the opening (20c) and thereby open up the opening (20c) before withdrawing from the superimposed position over the opening (20c) to a non-superimposed position.

The disclosure of Japanese Patent Application No. 2018-123405, filed on Jun. 28, 2018, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A reagent storage device comprising:
a reagent compartment for housing a reagent container, the reagent compartment being provided with an opening for insertion and removal of a probe used to extract a reagent from inside the reagent container housed in the reagent compartment;
a shutter configured to open and close the opening in the reagent compartment for housing the reagent container; and
a moving mechanism configured to move the shutter to an overlay position opposing the opening and separated from the opening before moving the shutter downward so as to close off the opening, and also configured to move the shutter, which is closing off the opening, upward to open up the opening before withdrawing the shutter from the overlay position opposing the opening and separated from the opening,
wherein the moving mechanism:
includes a guide member provided with an inclined portion inclined with respect to an opening plane of the opening, and a linear portion contiguous to the inclined portion and running parallel to the opening plane of the opening;
is configured to open up the opening by moving the shutter obliquely upward along the inclined portion;
is configured to move the shutter to the overlay position, and to withdraw the shutter from the overlay position, by moving the shutter in a horizontal direction along the linear portion; and
is configured to close off the opening by moving the shutter obliquely downward along the inclined portion.

2. The reagent storage device of claim 1, wherein the moving mechanism includes:
at least one drive source configured to generate drive force to drive the shutter; and
a drive force transmission section attached to the shutter and configured to transmit drive force from the drive source to the shutter.

3. The reagent storage device of claim 2, wherein the drive force transmission section includes:
a first drive force transmission section configured to move the shutter to the overlay position over the opening and to withdraw the shutter from the overlay position over the opening; and
a second drive force transmission section configured to move the shutter downward and upward.

4. The reagent storage device of claim 3, wherein the drive force transmission section includes:
one or more bearings provided on each of two side faces of the drive force transmission section with respect to a movement direction of the shutter; and
a guide member configured to guide the bearings, the guide member including an inclined portion inclined upward from the opening and a linear portion running parallel to an opening plane of the opening.

5. The reagent storage device of claim 1, wherein the shutter is provided with a buffer member on a face of the shutter on a side opposing the opening of the reagent compartment in a case in which the opening is closed off by the shutter.

6. The reagent storage device of claim 1, wherein an outer surface of at least one of a bottom face or a side face of the reagent compartment is cooled by a cooling source.

* * * * *